United States Patent
Kim et al.

(10) Patent No.: US 9,055,591 B2
(45) Date of Patent: Jun. 9, 2015

(54) SCHEDULING METHOD OF WIRELESS COMMUNICATION SYSTEM AND APPARATUS ADAPTED THERETO

(75) Inventors: Il Whan Kim, Incheon Metropolitan (KR); Sang-Boh Yun, Seongnam-si (KR); Sung Soo Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 501 days.

(21) Appl. No.: 12/642,096

(22) Filed: Dec. 18, 2009

(65) Prior Publication Data

US 2010/0165971 A1 Jul. 1, 2010

(30) Foreign Application Priority Data

Dec. 18, 2008 (KR) .................. 10-2008-0129046

(51) Int. Cl.
*H04B 7/208* (2006.01)
*H04W 72/08* (2009.01)
*H04L 5/00* (2006.01)

(52) U.S. Cl.
CPC ........... *H04W 72/082* (2013.01); *H04L 5/0007* (2013.01); *H04L 5/0037* (2013.01); *H04L 5/006* (2013.01); *H04L 5/0062* (2013.01); *H04L 5/0064* (2013.01)

(58) Field of Classification Search
CPC ... H04L 5/0007; H04L 5/0037; H04L 5/0062; H04L 5/0064; H04L 5/006; H04L 5/00; H04W 72/082

USPC .......... 370/329, 208, 342; 375/340, 342, 148; 455/450

See application file for complete search history.

(56) References Cited

U.S. PATENT DOCUMENTS

| | | | |
|---|---|---|---|
| 2002/0021747 A1* | 2/2002 | Sequeira ................ | 375/148 |
| 2004/0022336 A1* | 2/2004 | Yu et al. ................ | 375/346 |
| 2007/0157279 A1* | 7/2007 | Hara et al. ............. | 725/124 |
| 2007/0202904 A1 | 8/2007 | Cheng et al. | |
| 2007/0218904 A1* | 9/2007 | Park et al. ............. | 455/436 |
| 2008/0045227 A1* | 2/2008 | Nagai .................... | 455/450 |
| 2009/0116541 A1* | 5/2009 | Farrokhi et al. ....... | 375/136 |
| 2009/0228598 A1* | 9/2009 | Stamoulis et al. ..... | 709/230 |
| 2011/0201372 A1* | 8/2011 | Luo et al. .............. | 455/509 |

* cited by examiner

*Primary Examiner* — Pao Sinkantarakorn
*Assistant Examiner* — Richard Chang
(74) *Attorney, Agent, or Firm* — The Farrell Law Firm, P.C.

(57) ABSTRACT

A scheduling method and an apparatus adapted thereto are disclosed that can allocate sub-carriers to a terminal at the cell edge in a wireless communication. The scheduling method includes, calculating average interference and instantaneous interference of at least two terminals for a sub-carrier, determining whether an interference for the sub-carrier is partial interference, and allocating a corresponding sub-carrier serving as transmission resource to a terminal having a higher ratio of the instantaneous interference compared to the average interference than the other terminal if an interference for the sub-carrier is partial interference.

20 Claims, 3 Drawing Sheets

SCHEDULING METHOD OF WIRELESS COMMUNICATION SYSTEM AND APPARATUS ADAPTED THERETO

PRIORITY

This application claims priority to an application entitled "SCHEDULING METHOD OF WIRELESS COMMUNICATION SYSTEM AND APPARATUS ADAPTED THERETO" filed in the Korean Intellectual Property Office on Dec. 18, 2008 and assigned Serial No. 10-2008-0129046, the contents of which are incorporated herein by reference.

BACKGROUND OF THE INVENTION

1. Field of the Invention

The present invention relates generally to wireless communication systems, and more particularly, to a scheduling method and an apparatus adapted thereto that can allocate sub-carriers, less susceptible to interference, to a terminal at the cell edge.

2. Description of the Related Art

Orthogonal Frequency Division Multiplexing (OFDM) refers to a method of digital modulation in which a data stream having a high transmission rate is split into a data stream having a low transmission rate, which split data streams are simultaneously transmitted through sub-carriers. In frequency domain, one OFDM symbol is composed of several sub-carriers that are mathematically arranged such that they are orthogonal to each other. Although the sub-carriers are partially superposed in their sidebands, they can be recovered into the original signal at the receiver.

Long Term Evolution (LTE) and WiMAX systems employ OFDMA as multiple access technology.

OFDMA refers to a method of modulation based on a concept in which a plurality of terminals share one physical channel. That is, OFDMA allows respective terminals to simultaneously use a plurality of sub-carriers and to perform multiple access. If a portion of the sub-carriers experience substantial fading, the base station selects only those sub-carriers with favorable channel states and allocates the terminals thereto. If a plurality of terminals exist in a cell, the base station may split sub-carriers in a favorable channel state and then allocate them to respective terminals.

LTE systems and 3.5$^{th}$ to 4$^{th}$ generation mobile communication systems consider the frequency reuse factor of 1. Accordingly, the systems use the total bandwidth to efficiently use frequency resources restricted within all cells or sectors.

However, since adjacent cells use the same frequency band, co-channel interference is a major problem, as it causes deterioration in the link quality of terminals. This co-channel interference is worse in terminals at the cell edge.

In WiMAX and IEEE 802.20 working groups considering mobility, a Fractional Frequency Reuse (FFR) technique has been proposed to resolve a channel problem at the cell edge. The technique, however, is disadvantageous in that it can be performed only when the base station is initially established.

In a Hierarchical Cell Structure (HCS) environment where macro, pico, and femto cells are mixed, small base stations for the pico or femto cell may be arbitrarily established. That is, in such an SCS environment, the conventional FFR technique cannot be effectively employed considering the arbitrarily established base stations.

SUMMARY OF THE INVENTION

The present invention has been made in view of the above problems, and provides a scheduling method and an apparatus adapted thereto that can reuse the frequency reuse factor of 1 or close to 1, avoid inter-cell interference, and allocate resources to terminals in a wireless communication system, in an HCS environment where a macro, pico, and femto cells are mixed.

In accordance with an embodiment of the present invention, disclosed is a scheduling method of a wireless communication system, including calculating average interference and instantaneous interference of each terminal for a sub-carrier, determining whether an interference for the sub-carrier is partial interference, and allocating a corresponding sub-carrier serving as a transmission resource to a terminal having a higher ratio of the instantaneous interference compared to the average interference than the other terminal if the interference for the sub-carrier is partial interference.

The step of allocating a corresponding sub-carrier includes first allocating a sub-carrier having partial interference to a terminal having higher average interference ($\bar{I}_i$) according to the following Equation, $$d_j^k(t) = \operatorname*{argmax}_i \left( \frac{\bar{I}_i}{I_{i,j}} \cdot \frac{r_{i,j}^k(t)}{\tilde{R}_i^k} \right),$$

$$\text{Where } \tilde{R}_i^k = \begin{cases} \left(1 - \frac{1}{t_c}\right)\tilde{R}_i^k + \frac{1}{t_c}r_{i,j}^k(t), & i = d_j^k(t) \\ \left(1 - \frac{1}{t_c}\right)\tilde{R}_i^k, & i \neq d_j^k(t), \end{cases}$$

$$\bar{I}_i = \sum_{j=1}^{J} I_{j,i}$$

In accordance with another embodiment of the present invention, disclosed is an apparatus for performing a scheduling operation in a wireless communication system, including a scheduler of a base station. The scheduler calculates average interference and instantaneous interference of each terminal for a sub-carrier, and allocates a corresponding sub-carrier serving as a transmission resource to a terminal having a higher ratio of the instantaneous interference compared to the average interference than the other terminal if the interference for the sub-carrier is partial interference.

The scheduler first allocates a sub-carrier having partial interference to a terminal having a higher ratio of the instantaneous interference ($I_{i,j}$) compared to the average interference ($\bar{I}_i$) than the other terminal according to the following Equation, $$d_j^k(t) = \operatorname*{argmax}_i \left( \frac{\bar{I}_i}{I_{i,j}} \cdot \frac{r_{i,j}^k(t)}{\tilde{R}_i^k} \right),$$

$$\text{Where } \tilde{R}_i^k = \begin{cases} \left(1 - \frac{1}{t_c}\right)\tilde{R}_i^k + \frac{1}{t_c}r_{i,j}^k(t), & i = d_j^k(t) \\ \left(1 - \frac{1}{t_c}\right)\tilde{R}_i^k, & i \neq d_j^k(t), \end{cases}$$

$$\bar{I}_i = \sum_{j=1}^{J} I_{j,i}$$

BRIEF DESCRIPTION OF THE DRAWINGS

The features and advantages of the present invention will become more apparent from the following detailed description in conjunction with the accompanying drawings, in which.

DETAILED DESCRIPTION OF EMBODIMENTS OF THE INVENTION

Hereinafter, embodiments of the present invention are described in detail with reference to the accompanying drawings. The same reference numbers are used throughout the drawings to refer to the same or similar parts. Detailed descriptions of well-known functions and structures incorporated herein may be omitted for the sake of clarity and conciseness.

In OFDMA based mobile systems, base stations select users based on a scheduler that has selected each wireless resource and services data that a corresponding user has requested. For example, there is an OFDM cellular system that includes K cells, $k \in \kappa = [1, \ldots, K]$. In that case, it is assumed that each cell is composed of J sub-carriers, $j \in J = [1, \ldots J]$, and cell k serves total $N_k$ terminals, $i \in I_k = [1, \ldots, N_k]$. Terminal i, included in cell k, may be served the data rate, $r_{i,j}^k(t)$, at the time point t, which is expressed as the following Equation 1.

$$r_{i,j}^k(t) = \log_2\left(1 + \frac{|\gamma_{i,j}^k(t)|^2 \cdot p_j^k(t)}{\sum_{l=1, l \neq k}^{K} |\gamma_{i,j}^l(t)|^2 \cdot p_j^l(t) + N}\right) \cdot \delta_{i,j}^k(t) \quad (1)$$

Figure 1:
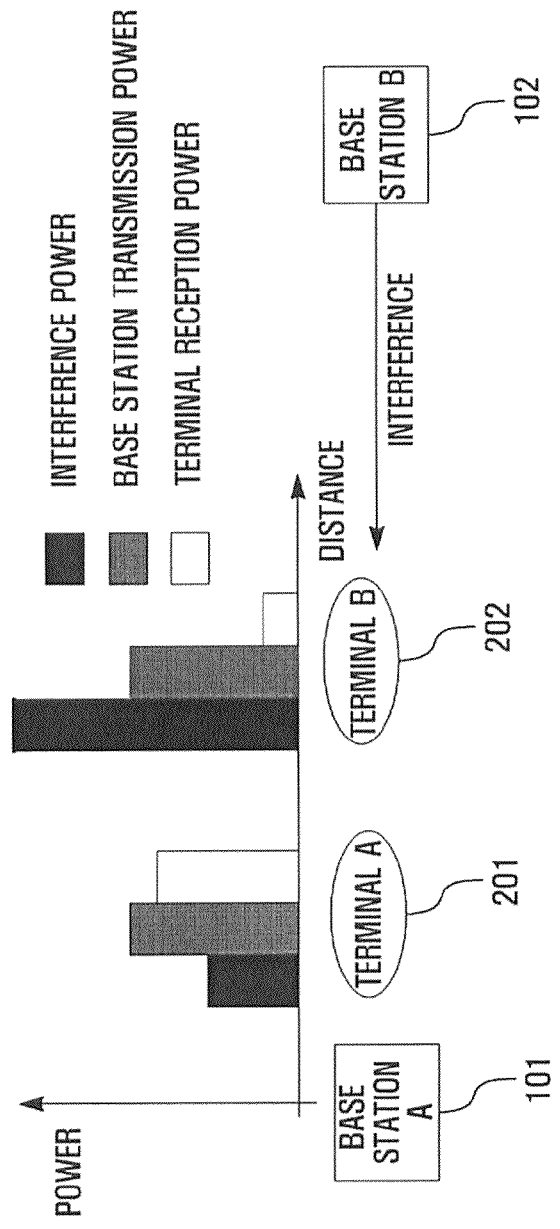
FIG. 1 illustrates interference between adjacent base stations in a wireless communication system according to an embodiment of the present invention.

In FIG. 1, $\gamma_{i,j}^k(t)$ denotes an instantaneous channel gain at the time point when terminal i has used j sub-carrier in cell k, and $p_j^k(t)$ denotes the amount of transmission power of a base station allocated to a corresponding sub-carrier. According to Equation 1, the instantaneous throughput of cell K(cell k), $T_k(t)$, can be acquired by the following Equation 2.

$$T_k(t) = \sum_{i=1}^{N_k} \sum_{j=1}^{J} r_{i,j}^k(t) \cdot \delta_{i,j}^k(t), \quad (2)$$

$$\text{Subject to } \sum_{j=1}^{J} \sum_{i=1}^{N_k} p_i^k(t) = P, \sum_{i=1}^{N_k} \delta_{i,j}^k(t) = 1$$

In Equation 2, the scheduler of cell k defines a user as $\alpha_j^k(t)(\alpha_j^k(t) \in I_k)$, where the user will be allocated to the j-th sub-carrier at time point t. The scheduler also defines a set, composed of $\alpha_j^k(t)$, as $A_k(t)(A_k(t) = [\alpha_1^k(t), \ldots, \alpha_J^k(t)]$. In that case, the following Equation 3 can express the mapping relationship between a terminal and sub-carrier by the scheduler of a base station.

$$\delta_{i,j}^k(t) = \begin{cases} 1, & i = \alpha_j^k(t) \\ 0, & i \neq \alpha_j^k(t) \end{cases} \quad (3)$$

Figure 3:
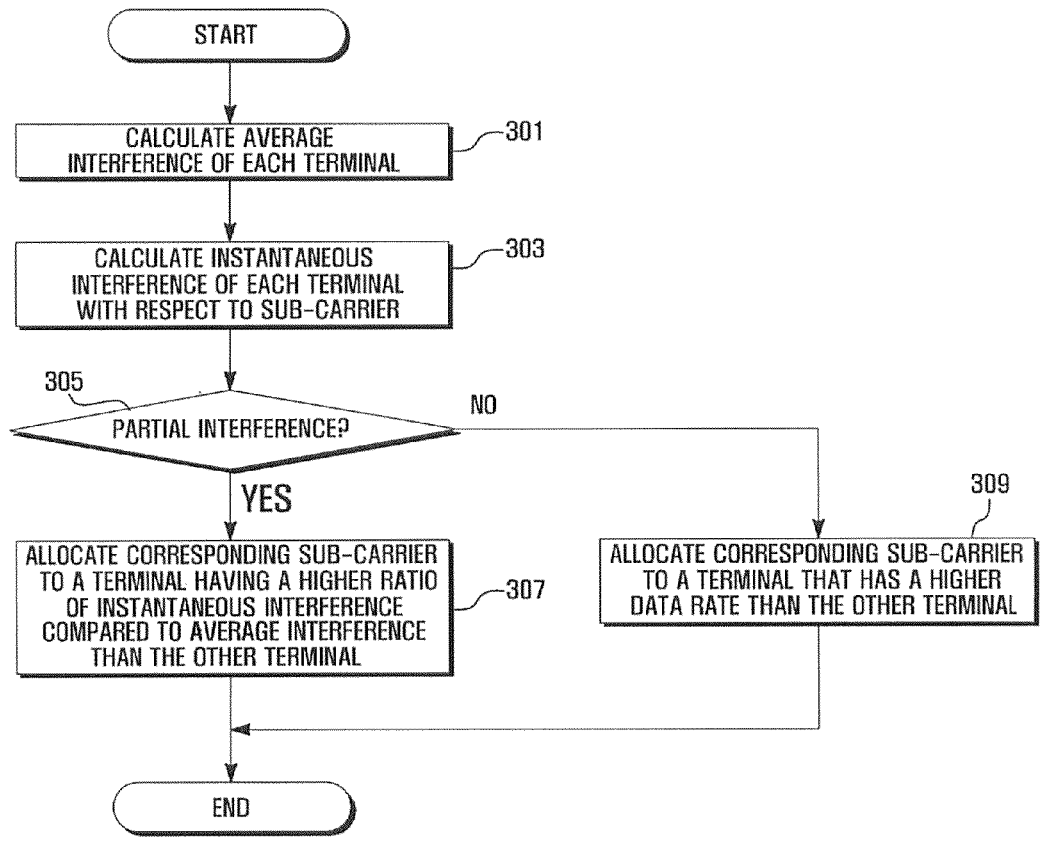
FIG. 3 illustrates a scheduling method of a wireless communication system according to an embodiment of the present invention.

In FIG. 3, $\alpha_j^k(t)$ can be determined by the following Equation 4 if a Proportional Fair (PF) as a opportunistic schedule is applied to the system.

$$a_j^k(t) = \operatorname*{argmax}_i \left(\frac{r_{i,j}^k(t)}{\bar{R}_i^k}\right) \quad (4)$$

$$\text{Where } \bar{R}_i^k = \begin{cases} \left(1 - \frac{1}{t_c}\right)\bar{R}_i^k + \frac{1}{t_c}r_{i,j}^k(t), & i = \alpha_j^k(t) \\ \left(1 - \frac{1}{t_c}\right)\bar{R}_i^k, & i \neq \alpha_j^k(t) \end{cases}$$

In a scheduling method according to an embodiment of the present invention, $\alpha_j^k(t)$ can be determined as the following Equation 5.

$$a_j^k(t) = \operatorname*{argmax}_i \left(\frac{\bar{I}_i}{I_{i,j}} \frac{r_{i,j}^k(t)}{\bar{R}_i^k}\right) \quad (5)$$

$$\text{Where } \bar{R}_i^k = \begin{cases} \left(1 - \frac{1}{t_c}\right)\bar{R}_i^k + \frac{1}{t_c}r_{i,j}^k(t), & i = \alpha_j^k(t) \\ \left(1 - \frac{1}{t_c}\right)\bar{R}_i^k, & i \neq \alpha_j^k(i) \end{cases}, \bar{I}_i = \sum_{j=1}^{J} I_{j,i}$$

In Equation 5, $\bar{I}_i$ denotes average interference of terminal i, and $I_{j,i}$ denotes instantaneous interference when terminal i uses j-th sub-carrier. That is, if a particular terminal is allocated to a particular sub-carrier, the method according to an embodiment of the present invention considers the average interference and the instantaneous interference of the terminal, as described in Equation 5. When scheduling is performed as described in Equation 5, the terminal at a cell edge has a large average interference, and thus is allocated a sub-carrier where the amount of interference is reduced from the base station.

FIG. 1 illustrates interference between adjacent base stations in a wireless communication system according to an embodiment of the present invention.

Referring to FIG. 1, there are two adjacent base stations A and B, which are numbered by 101 and 102, respectively. Base station A (101) is linked to terminal A (201) and terminal B (202). That is, terminal A (201) and terminal B (202) are located within a cell coverage of base station A (101), or terminal A (201) is located closer to base station A (101) than terminal B (202). As shown in FIG. 1, base station A (101) as a serving base station performs transmission with the same transmission power. However, since the amount of interference by base station B (102) is higher at terminal B (202) than at terminal A (201), terminal B (202) receives substantially less power than terminal A (201).

If channel gains for j-th sub-carrier of terminal A (201) and terminal B (202) are defined as $\gamma_{a,j}$ and $\gamma_{b,j}$, respectively, the data rates of terminals A and B (201 and 202), $r_{a,j}$ and $r_{b,j}$, can be expressed by the following Equation 6, using the average interferences, received by terminals A and B (201 and 202) at the adjacent cell (i.e., base station B (102)), $I_{a,j}$ and $I_{b,j}$.

$$r_{a,j} = w \cdot \log_2\left(1 + \frac{|\gamma_{a,j}|^2 \cdot p_j}{I_{a,j} + N}\right) \text{ for terminal } A \text{ (201)}, \quad (6)$$

and $$r_{b,j} = w \cdot \log_2\left(1 + \frac{|\gamma_{b,j}|^2 \cdot p_j}{I_{b,j} + N}\right) \text{ for terminal } B \text{ (202)}$$

In FIG. 6, $p_j$ denotes transmission power of a base station allocated to the j-th sub-carrier, w denotes a bandwidth, and N denotes thermal noise.

As shown in FIG. 1, terminal A (201) is located closer to base station A (101), but terminal B (202) is more remotely located from base station A (101), or located at the cell edge of base station A (101). Therefore, the average interference is always higher at terminal B (202) than at terminal A (201), i.e., $I_{a,j}{}^k < I_{b,j}{}^k$.

Therefore, according to Equation 6, the data rate of terminal A (201) is always larger that that of terminal B (202), i.e. $r_{a,j}{}^k > r_{b,j}{}^k$.

It is assumed that the ratio of interference using the I-th sub-carrier compared to interference using the j-th sub-carrier, $\alpha(0 \le \alpha < 1)$ is reduced. That is, the interference for the j-th sub-carrier is $\alpha I_j$ and the interference for the I-th sub-carrier is $\alpha I_I$, the j-th sub-carrier is susceptible to full interference of the adjacent cells ($\alpha > 1$) and the I-th sub-carrier is susceptible to partial interference ($0 < \alpha < 1$).

In this case, the data rate of terminals A and B (201 and 202) can be expressed by the following Equation 7.

$$r_{a,I} = w \cdot \log_2\left(1 + \frac{|\gamma_{a,I}|^2 \cdot p_I}{\alpha \cdot I_{a,j} + N}\right), \quad (7)$$

and $$r_{b,I} = w \cdot \log_2\left(1 + \frac{|\gamma_{b,I}|^2 \cdot p_I}{\alpha \cdot I_{b,j} + N}\right)$$

If the I-th sub-carrier is allocated to terminals A and B (201 and 202), respectively, compared with when the j-th sub-carrier is allocated to terminals A and B (201 and 202), respectively, the gains of terminals A and B (201 and 202) can be expressed by the following Equation 8.

$$k_a = r_{a,I} - r_{a,j} \quad (8)$$
$$\cong w \cdot \log_2\left(\frac{|\gamma_{a,I}|^2 \cdot (I_{a,j} + N)}{|\gamma_{a,j}|^2 \cdot (\alpha \cdot I_{a,j} + N)}\right)$$
$$\cong w \cdot \log_2\left(\frac{I_{a,j} + N}{a \cdot I_{a,j} + N}\right) \text{ for the gain of terminal } A \ (201),$$

and $$k_b = r_{b,I} - r_{b,j}$$
$$\cong w \cdot \log_2\left(\frac{|\gamma_{b,I}|^2 \cdot (I_{b,j} + N)}{|\gamma_{b,j}|^2 \cdot (\alpha \cdot I_{b,j} + N)}\right)$$
$$\cong w \cdot \log_2\left(\frac{I_{b,j} + N}{a \cdot I_{b,j} + N}\right) \text{ for the gain of terminal } B \ (202)$$

In FIG. 8, $$K_a = 2^{\frac{k_a}{w}}, \ K_b = 2^{\frac{k_b}{w}}, \ I_{a,j} = \left(\frac{1}{\overline{R_a^k}}\right)^n p \text{ and } I_{b,j} = \left(\frac{1}{\overline{R_b^k}}\right)^n p.$$

Also, $\overline{R_a{}^k}$ and $\overline{R_b{}^k}$ denote the average distances between the base stations and terminals A and B, respectively, where the base stations affects interference terminals A and B (201 and 202). The symbol 'n' denotes an attenuation coefficient.

Since terminal B (202) is located at a cell edge, the average distance between terminal B (202) and the base station affecting interference to terminal B is smaller than that between terminal A (201) and the base station affecting interference to terminal A, i.e., $\overline{R_a{}^k} > \overline{R_b{}^k}$.

In an embodiment of the present invention, it is assumed that the I-th sub-carrier is allocated to terminals A and B (201 and 202). The difference of the gains between terminal B (202) and terminal A (201) can be expressed by the following Equation 9.

$$K_b - K_a = \frac{I_{b,j} + N}{\alpha \cdot I_{b,j} + N} - \frac{I_{a,j} + N}{\alpha \cdot I_{a,j} + N} \quad (9)$$
$$= \frac{1}{C} \cdot \left[\alpha \cdot \left(\left(\frac{1}{\overline{R_a}}\right)^n - \left(\frac{1}{\overline{R_b}}\right)^n\right) - \left(\left(\frac{1}{\overline{R_a}}\right)^n - \left(\frac{1}{\overline{R_b}}\right)^n\right)\right]$$

The average distance between terminal B (202) and the base station affecting interference to terminal B is smaller than that between terminal A (201) and the base station affecting interference to terminal A, i.e., $\overline{R_a{}^k} > \overline{R_b{}^k}$. Therefore, the following Equation 10 is established.

$$\left(\frac{1}{\overline{R_a^k}}\right)^n - \left(\frac{1}{\overline{R_b^k}}\right)^n < 0 \quad (10)$$

According to Equation 10, Equation 9 always has a positive value. Therefore, it will be appreciated that the gain can acquire a higher value when the I-th sub-carrier is allocated to terminal B (202) than when the I-th sub-carrier is allocated to terminal A (201).

In an embodiment of the present invention, if the same transmission power is allocated to each sub-carrier, based on the average interference from the adjacent cells, it is more advantageous to allocate a sub-carrier of a smaller amount of interference to terminal B (202) located at the cell edge than to terminal A (201), i.e., $K_b > K_a$ wherein $0 < \alpha < 1$. In the contrary case, it is more advantageous to allocate a sub-carrier of a smaller amount of interference to terminal A (201) than terminal B (202), i.e., $K_b < K_a$, wherein $\alpha > 1$.

If a PF scheduler is utilized as described in Equation 4, a corresponding sub-carrier is allocated to a terminal having a higher data rate $r_{a,j}$ or $r_{b,j}$ than the other terminal.

Since terminal A (201) located closer to base station A (101) has lower interference than terminal B (202) located farther therefrom, the average interference affecting terminal B (202) is larger than that of terminal A (201), i.e., $I_{a,j}{}^k < I_{b,j}{}^k$. Therefore, according to Equation 6, the data rate of terminal A (201) is larger than that of terminal B (202), i.e., $r_{a,j}{}^k > r_{b,j}{}^k$. Therefore, if a PF scheduler is used as described in Equation 4, while it is more advantageous to allocate a sub-carrier having a smaller is amount of interference to terminal B (202) located at a cell edge than to the other terminal, the sub-carrier having a smaller amount of interference is allocated to the terminal having a higher data rate.

On the contrary, the scheduler according to an embodiment of the present invention can allocate a sub-carrier, susceptible to small interference, to a terminal having a higher ratio of instantaneous interference compared to average interference, using the parameter representing the instantaneous interference and the average interference in Equation 5, $$\frac{\bar{I}}{I_{i,j}}.$$

The scheduling method using the parameter $$\frac{\bar{I}}{I_{i,j}}$$

is explained in detail with reference to FIG. 2.

Figure 2:
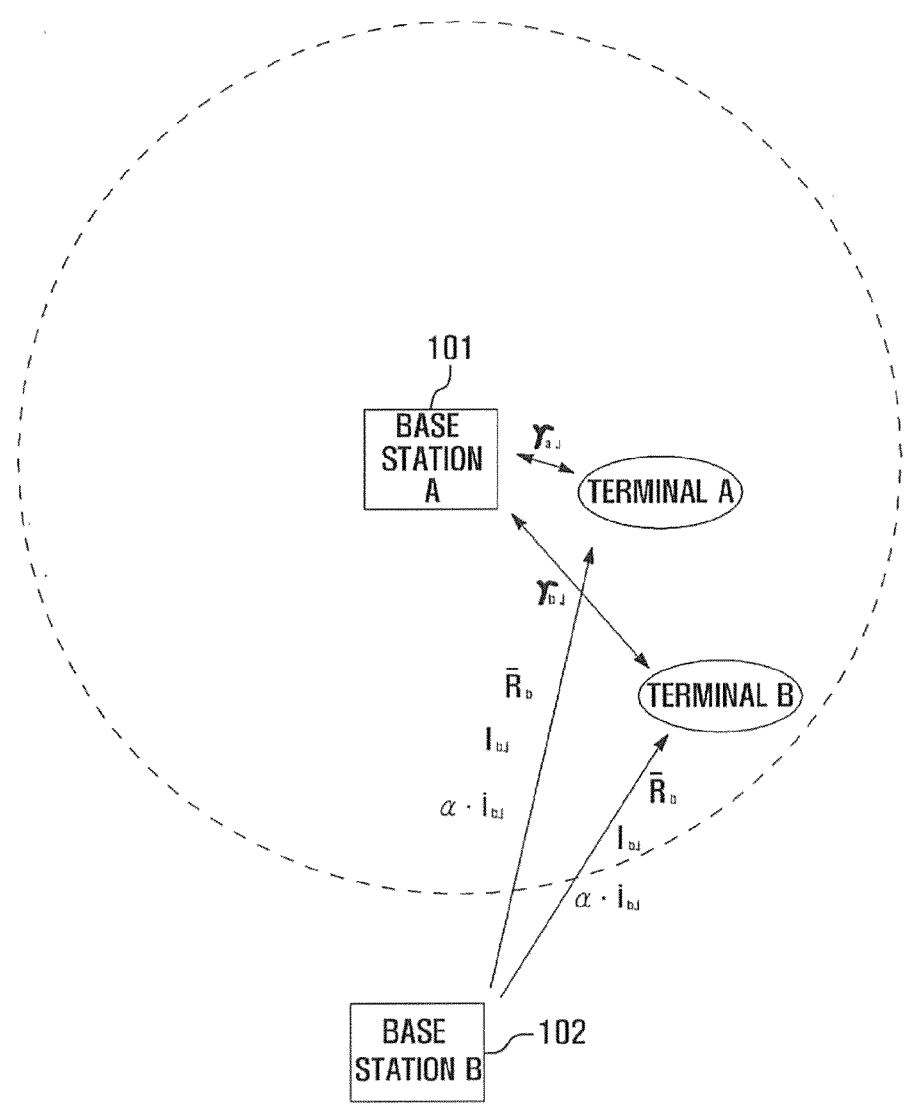
FIG. 2 illustrates a scheduling method of a wireless communication system according to an embodiment of the present invention.

FIG. 2 illustrates a scheduling method of a wireless communication system according to an embodiment of the present invention.

As shown in FIG. 2, there are two adjacent base stations A and B, which are numbered by 101 and 102, respectively. Base station A (101) is linked to terminal A (201) and terminal B (202). That is, terminal A (201) and terminal B (202) are located within cell coverage range of base station A (101), or terminal A (201) is located closer to base station A (101) than terminal B (202).

The following Table 1 is an example of parameters representing the instantaneous interference and the average interference, with respect to terminals. The following Equation 11 describes a scheduling method using the parameters.

TABLE 1

| | Avr. Interference | Inst. Interference | Thermal Noise |
|---|---|---|---|
| Terminal A (201) | 20 | 50 | 5 |
| Terminal B (202) | 10 | 25 | 5 |

$$\frac{\text{Avr.Interference}}{\text{Inst.Interference} + \text{ThermalNoise}} \quad (11)$$

In Table 1, it is assumed that 50% partial interference occurs if a particular sub-carrier is allocated to each terminal.

Since terminal B (202) is located at a cell edge, its average interference is higher than that of terminal A (201). However, if 50% interference is generated due to the adjacent cell, the instantaneous interference is reduced by 50% at both terminals A and B, respectively. Accordingly, terminal B (202) has a greater reduction of interference.

In that case, Equation 11 serves to establish the priority of allocation considering the average interference and the instantaneous interference. If Equation 11 is substituted to Table 1, it can be expressed by the following Equation 12.

$$\frac{\bar{I}_a}{I_{a,j} + N} = \frac{20}{10+5} = \frac{4}{3}, \frac{\bar{I}_b}{I_{b,j} + N} = \frac{50}{25+5} = \frac{5}{3} \quad (12)$$

As described in Equation 12, terminal A (201) is "4/3", and terminal B (202) is "5/3". That is, the sub-carrier with partial interference is allocated to terminal B (202) located at a cell edge.

The following Table 2 is another example that shows parameters representing the instantaneous interference and the average interference, with respect to terminals.

TABLE 2

| | Avr. Interference | Inst. Interference | Thermal Noise |
|---|---|---|---|
| Terminal A (201) | 20 | 50 | 5 |
| Terminal B (202) | 18 | 45 | 5 |

In Table 2, it is assumed that 10% partial interference occurs if a particular sub-carrier is allocated to each terminal.

Since terminal B (202) is located at a cell edge, its average interference is higher than that of terminal A (201). However, if 10% interference is generated due to the adjacent cell, the instantaneous interference is reduced by 10% at both terminals A and B, respectively. Accordingly, terminal B (202) has a greater reduction of interference.

In that case, Equation 11 serves to establish the priority of allocation considering the average interference and the instantaneous interference. If Equation 11 is substituted to Table 2, it can be expressed by the following Equation 13.

$$\frac{\bar{I}_a}{I_{a,j} + N} = \frac{20}{18+5} = \frac{20}{23}, \frac{\bar{I}_b}{I_{b,j} + N} = \frac{50}{45+5} = 1 \quad (13)$$

As described in Equation 13, terminal A (201) is "20/23", and terminal B (202) is "1". That is, the sub-carrier with partial interference is allocated to terminal B (202) located at a cell edge.

As described above, the scheduling method according to an embodiment of the present invention allocates a sub-carrier having less interference to a terminal having a greater decreased interference rate than the other terminal.

FIG. 3 illustrates a scheduling method of a wireless communication system according to an embodiment of the present invention. The scheduling method will be explained with respect to a sub-carrier.

Referring to FIG. 3, the base station calculates the average interference of each terminal, $\bar{I}$ (301). That is, the base station may calculate the average interference from an estimation report message where each terminal estimates and reports a received signal strength indication of its adjacent base station. The average interference $\bar{I}$ can be calculated using Equation 5.

After that, the base station calculates instantaneous interference for each terminal so a sub-carrier can be allocated as a transmission resource (303). That is, the base station estimates the instantaneous interference of terminals, $I_{i,j}$ for the j-th sub-carrier via Equation 5. i denotes the index of terminals.

The base station determines whether the interference for the sub-carrier is partial interference (305). That is, if the interference for the j-th sub-carrier is $\alpha I_j$, the base station determines whether the interference parameter of the j-th sub-carrier, $\alpha$, satisfies the condition $0<\alpha<1$.

If the base station determines that the interference for the sub-carrier is partial interference at 305, it allocates a corresponding sub-carrier serving as a transmissions resource to a terminal having a higher ratio of the instantaneous interference compared to the average interference (307) than the other terminal. That is, the base station determines the priority of allocation according to Equation 5 and allocates a corresponding sub-carrier to the terminal having a higher priority.

If the base station ascertains that the interference for the sub-carrier is not partial interference at 305, it allocates a corresponding sub-carrier to a terminal having a higher data rate (309) than the other terminal.

As described above, the scheduling method and an apparatus adapted thereto, according to the present invention, can allocate sub-carriers to terminals considering their average interference and present interference during the scheduling operation, thereby efficiently performing the allocation of the sub-carrier.

Although embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A scheduling method of a wireless communication system, comprising:
    calculating average interference and instantaneous interference of at least two terminals for a sub-carrier;
    determining whether an interference for the sub-carrier is partial interference; and allocating, if the interference for the subcarrier is determined as the partial interference, the sub-carrier to a terminal having a higher ratio of the average interference to the instantaneous interference for the subcarrier than other terminals.

2. The scheduling method of claim 1, wherein allocating a the sub-carrier comprises:

allocating the sub-carrier having the partial interference according to:

$$d_j^k(t) = \underset{i}{\operatorname{argmax}}\left(\frac{\bar{I}_i}{I_{i,j}} \cdot \frac{r_{i,j}^k(t)}{\tilde{R}_i^k}\right),$$

$$\text{Where } \tilde{R}_i^k = \begin{cases} \left(1-\frac{1}{t_c}\right)\tilde{R}_i^k + \frac{1}{t_c}r_{i,j}^k(t), & i = d_j^k(t) \\ \left(1-\frac{1}{t_c}\right)\tilde{R}_i^k, & i \neq d_j^k(t) \end{cases}, \bar{I}_i = \sum_{j=1}^{J} I_{j,i}$$

and wherein $\bar{I}_i$ denotes average interference of terminal i, and $I_{j,i}$ denotes instantaneous interference when terminal i uses j-th sub-carrier.

3. An apparatus for performing a scheduling operation in a wireless communication system, comprising a scheduler of a base station, wherein the scheduler calculates average interference and instantaneous interference of at least two terminals for a sub-carrier, and allocates, if the interference for the sub-carrier is determined as the partial interference, the sub-carrier to a terminal having a higher ratio of the average interference to the instantaneous interference for the subcarrier than other terminals.

4. The apparatus of claim 3, wherein the scheduler allocates the sub-carrier according to:

$$d_j^k(t) = \underset{i}{\operatorname{argmax}}\left(\frac{\bar{I}_i}{I_{i,j}} \cdot \frac{r_{i,j}^k(t)}{\tilde{R}_i^k}\right),$$

$$\text{Where } \tilde{R}_i^k = \begin{cases} \left(1-\frac{1}{t_c}\right)\tilde{R}_i^k + \frac{1}{t_c}r_{i,j}^k(t), & i = d_j^k(t) \\ \left(1-\frac{1}{t_c}\right)\tilde{R}_i^k, & i \neq d_j^k(t) \end{cases}, \bar{I}_i = \sum_{j=1}^{J} I_{j,i}$$

wherein $\bar{I}_I$ denotes average interference of terminal i, and $I_{j,i}$ denotes instantaneous interference when terminal i uses j-th sub-carrier.

5. A scheduling method of a base station in a wireless communication system, the method comprising:

calculating average interferences and instantaneous interferences for a terminal and another terminal for a sub-carrier;

allocating the sub-carrier to the terminal, when the sub-carrier has less interference to the terminal and the terminal has a greater decreased total interference rate than the another terminal, based on the calculated average interferences and the calculated instantaneous interferences; and communicating with the terminal using the allocated sub-carrier.

6. The method of claim 5, wherein the terminal allocated the subcarrier has a higher ratio of the average interference to the instantaneous interference than the another terminal.

7. The method of claim 5, wherein the sub-carrier allocated to the terminal has an interference parameter of the interference of the sub-carrier to the terminal, wherein the parameter has a value of between 0 and 1.

8. The method of claim 5, wherein the average interference for the terminal is calculated based on an estimation report message received from the terminal.

9. A method of receiving scheduling information from a base station, by a terminal, in a wireless communication system, the method comprising:

receiving allocation information of a sub-carrier from the base station, the sub-carrier being allocated to the terminal when the sub-carrier has less interference to the terminal and the terminal has a greater decreased total interference rate than another terminal, based on average interferences and instantaneous interferences of the terminal and the another terminal; and communicating with the base station using the allocated sub-carrier.

10. The method of claim 9, wherein the terminal allocated the sub-carrier has a higher ratio of the instantaneous interference compared to the average interference than the another terminal.

11. The method of claim 9, wherein the sub-carrier allocated to the terminal has an interference parameter of the interference of the sub-carrier to the terminal, wherein the parameter has a value of between 0 and 1.

12. The method of claim 9, wherein the wherein the average interference for the terminal is calculated based on an estimation report message transmitted to the base station.

13. A base station in a wireless communication system, the base station comprising:

a scheduler configured to calculate average interferences and instantaneous interferences for a terminal and another terminal for a sub-carrier, and allocate the sub-carrier to the terminal, when the sub-carrier has less interference to the terminal and the terminal has a greater decreased total interference rate than the another terminal, based on the calculated average interferences and the calculated instantaneous interferences; and a transceiver configured to communicate with the terminal using the allocated sub-carrier.

14. The base station of claim 13, wherein the terminal allocated the sub-carrier has a higher ratio of the average interference to the instantaneous interference than the another terminal.

15. The base station of claim 13, wherein the sub-carrier allocated to the terminal has an interference parameter of the interference of the sub-carrier for the terminal, wherein the parameter has a value of between 0 and 1.

16. The base station of claim 13, wherein the average interference for the terminal is calculated based on an estimation report message received from the terminal.

17. A terminal in a wireless communication system, the terminal comprising:

a controller configured to receive allocation information of a sub-carrier from a base station, the sub-carrier being allocated to the terminal when the sub-carrier has less interference to the terminal and the terminal has a greater decreased interference rate than another terminal, based on average interferences and instantaneous interferences of the terminal and the another terminal; and a transceiver configured to communicate with the base station using the allocated sub-carrier.

18. The terminal of claim 17, wherein the terminal allocated the sub-carrier has a higher ratio of the instantaneous interference compared to the average interference than the another terminal.

19. The terminal of claim 17, wherein the sub-carrier allocated to the terminal has an interference parameter of the interference of the sub-carrier for the terminal, wherein the parameter has a value of between 0 and 1.

20. The terminal of claim 17, wherein the wherein the average interference for the terminal is calculated based on an estimation report message transmitted to the base station.

* * * * *